(12) United States Patent
Bolts

(10) Patent No.: US 9,514,343 B1
(45) Date of Patent: Dec. 6, 2016

(54) BARCODE INVENTORY AND PAYMENT MANAGEMENT SYSTEM

(71) Applicant: Lorita Bolts, Hawthorne, CA (US)

(72) Inventor: Lorita Bolts, Hawthorne, CA (US)

( * ) Notice: Subject to any disclaimer, the term of this patent is extended or adjusted under 35 U.S.C. 154(b) by 0 days.

(21) Appl. No.: 14/997,723

(22) Filed: Jan. 18, 2016

(51) Int. Cl.
| G06K 19/06 | (2006.01) |
| G06K 7/10 | (2006.01) |
| G06Q 10/08 | (2012.01) |
| G06Q 20/10 | (2012.01) |

(52) U.S. Cl.
CPC ......... *G06K 7/10564* (2013.01); *G06Q 10/087* (2013.01); *G06Q 20/105* (2013.01); *G06K 2007/10524* (2013.01)

(58) Field of Classification Search
CPC .............. G06K 7/10564; G06K 2007/10524; G06Q 10/087; G06Q 20/105
USPC ........................................ 235/379, 487, 492
See application file for complete search history.

(56) References Cited

U.S. PATENT DOCUMENTS

| 7,924,156 | B2 * | 4/2011 | Colby ................ G06K 19/0723 235/380 |
| 8,917,159 | B2 * | 12/2014 | McAllister ........... G06Q 10/087 340/10.51 |
| 2004/0193497 | A1 * | 9/2004 | Tanaka ................... G06Q 20/20 705/16 |
| 2006/0202803 | A1 * | 9/2006 | Yoon ..................... G06K 7/0008 340/10.4 |
| 2007/0109101 | A1 * | 5/2007 | Colby ................ G06K 19/0723 340/10.4 |
| 2009/0228467 | A1 * | 9/2009 | Asanuma ............. G06Q 10/087 |
| 2010/0289627 | A1 * | 11/2010 | McAllister ........... G06Q 10/087 340/10.42 |
| 2013/0046659 | A1 * | 2/2013 | Junger ................... G06Q 10/08 705/28 |
| 2014/0207660 | A1 * | 7/2014 | Brink ................. G06Q 20/3278 705/39 |
| 2015/0178643 | A1 * | 6/2015 | Park .................... G06Q 30/0641 705/5 |

* cited by examiner

*Primary Examiner* — Paultep Savusdiphol
(74) *Attorney, Agent, or Firm* — Michael I. Kroll; Edwin D. Schindler

(57) ABSTRACT

A barcode and chip inventory and payment management system is disclosed. A product information label with a bar code and an embedded barcode chip incorporating an anti-theft device is fixed to each product shipped with the embedded chip containing an individual product code and bank account routing data. The chip may be programmed to further contain pricing and markup information so that when the product is purchased (or returned) and scanned, the money involved is automatically transferred from the customer to the correct accounts and the item is added to or subtracted from the appropriate inventory.

12 Claims, 6 Drawing Sheets

BARCODE INVENTORY AND PAYMENT MANAGEMENT SYSTEM

BACKGROUND OF THE INVENTION

Field of the Invention

The present invention relates generally to inventory management and payment systems and, more specifically, to an inventory management and payment system that allows the stakeholders in the shipping and stocking of various items to receive payment immediately as the items are purchased.

Even more specifically, it relates to an inventory management and payment system where the various items are specifically and individually labeled so that each individual transaction is logged and immediately reflected in the status of the inventory.

Description of the Prior Art

There are other inventory management systems which provide for accountability and inventory management. While these systems may be suitable for the purposes for which they where designed, they would not be as suitable for the purposes of the present invention as heretofore described. It is thus desirable to provide an inventory and payment management system where information in a barcode chip includes a product ID, the price, the vendors account number (with regard to the wholesaler), the routing numbers of the relevant bank accounts, and the percentage of the retail price that the retailer retains. It is further desirable to have this information immediately transmitted at the point of sale so that the users have real time information regarding inventory and moneys owed and received.

SUMMARY OF THE PRESENT INVENTION

A primary object of the present invention is to provide a retail product label that includes information about the labeled product.

Another object of the present invention is to provide a product label that has specific information regarding the product in reference to the inventory of the retail outlet.

Yet another object of the present invention is to provide a product label that includes the percentage of the retail price that is due the retailer at point of sale.

Still yet another object of the present invention is to provide a product label that allows for the immediate transfer of funds both from the purchaser to the retailer and to the wholesaler from the retailer.

Another object of the present invention is to provide a product information label that contains the vendors specific account number in regards to the wholesaler or manufacturer that allows both of them to have a real time picture of the inventory in the retailer's establishment.

Yet another object of the present invention is to provide a product information label that includes a barcode chip containing the routing information of the relevant bank accounts so that the cash is transferred quickly as soon as the item is scanned at the retailer point of sale.

Still yet another object of the present invention is to provide a product information label that includes the percentage of the retail price that is due to the retailer so that the amount may be immediately credited to the retailer's account.

Additional objects of the present invention will appear as the description proceeds.

The present invention overcomes the shortcomings of the prior art by providing a hands-off approach to inventory management and the outstanding amount owed to the wholesaler or supplier by immediately crediting and automatically transferring the moneys involved to and from the appropriate bank accounts.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

DESCRIPTION OF THE REFERENCED NUMERALS

Turning now descriptively to the drawings, in which similar reference characters denote similar elements throughout the several views, the figures illustrate the use of the present invention. With regard to the reference numerals used, the following numbering is used throughout the various drawing figures.

10 product info label
12 barcode chip
14 visible bar code
16 information contained in tag
18 product name
20 manufacturer name
22 individual product code
24 product price
26 manufacturers' vendor account number
28 bank routing numbers
30 retailer percentage of payment
32 retailer database
34 point of sale register
36 information transfer step
38 vendor bank account
40 manufacturer/developer bank account
42 database tracking
44 product returned
46 info label scanned
48 individual product ID back into inventory
50 funds deducted from retailer/vendor account
52 antitheft device
C customer
P product
S barcode scanner

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
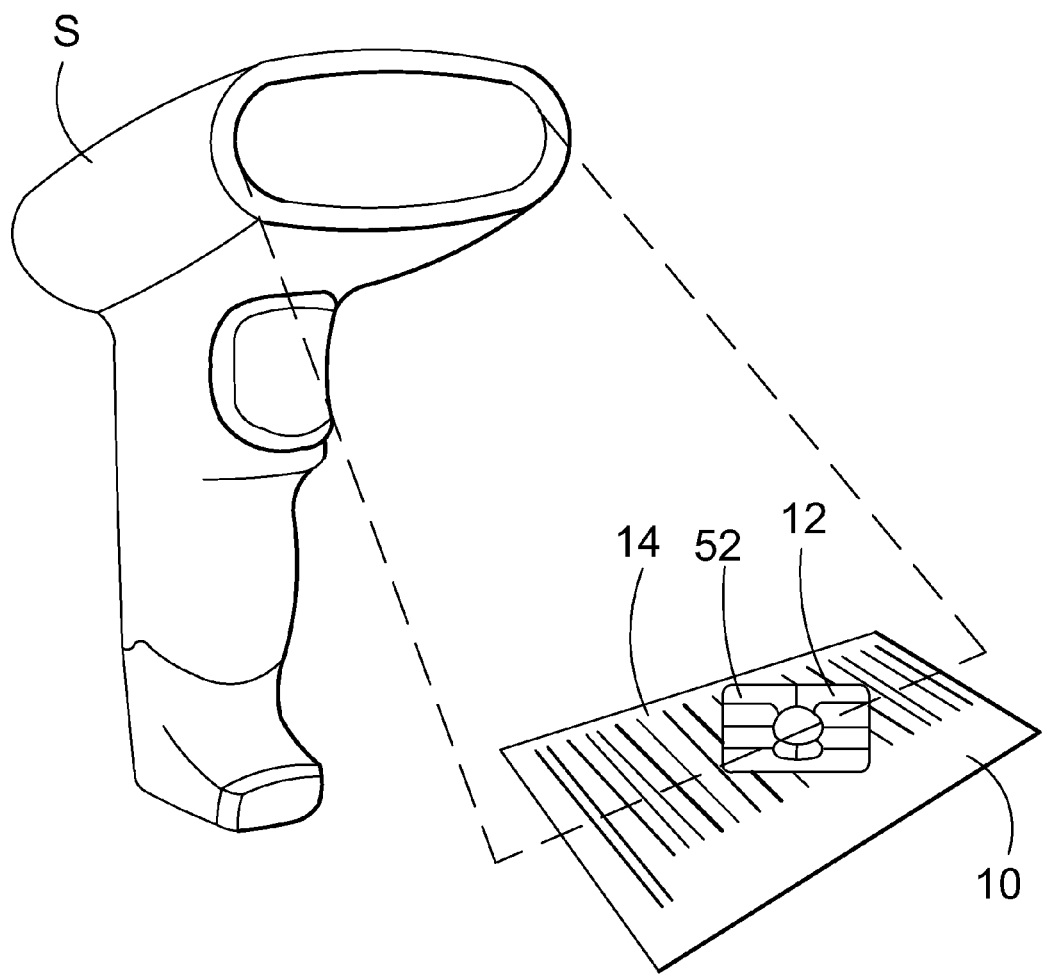
FIG. 1 is an illustrative view of the product information label of the present invention.

FIG. 1 shows the present invention being a product information label 10. Embedded in the label 10 is a barcode chip 12 incorporating antitheft device 52 and information that will be discussed in more detail further below. On the surface of the label 10 is a visible bar code for scanning with a bar code reader (not shown in this Figure).

Figure 2:
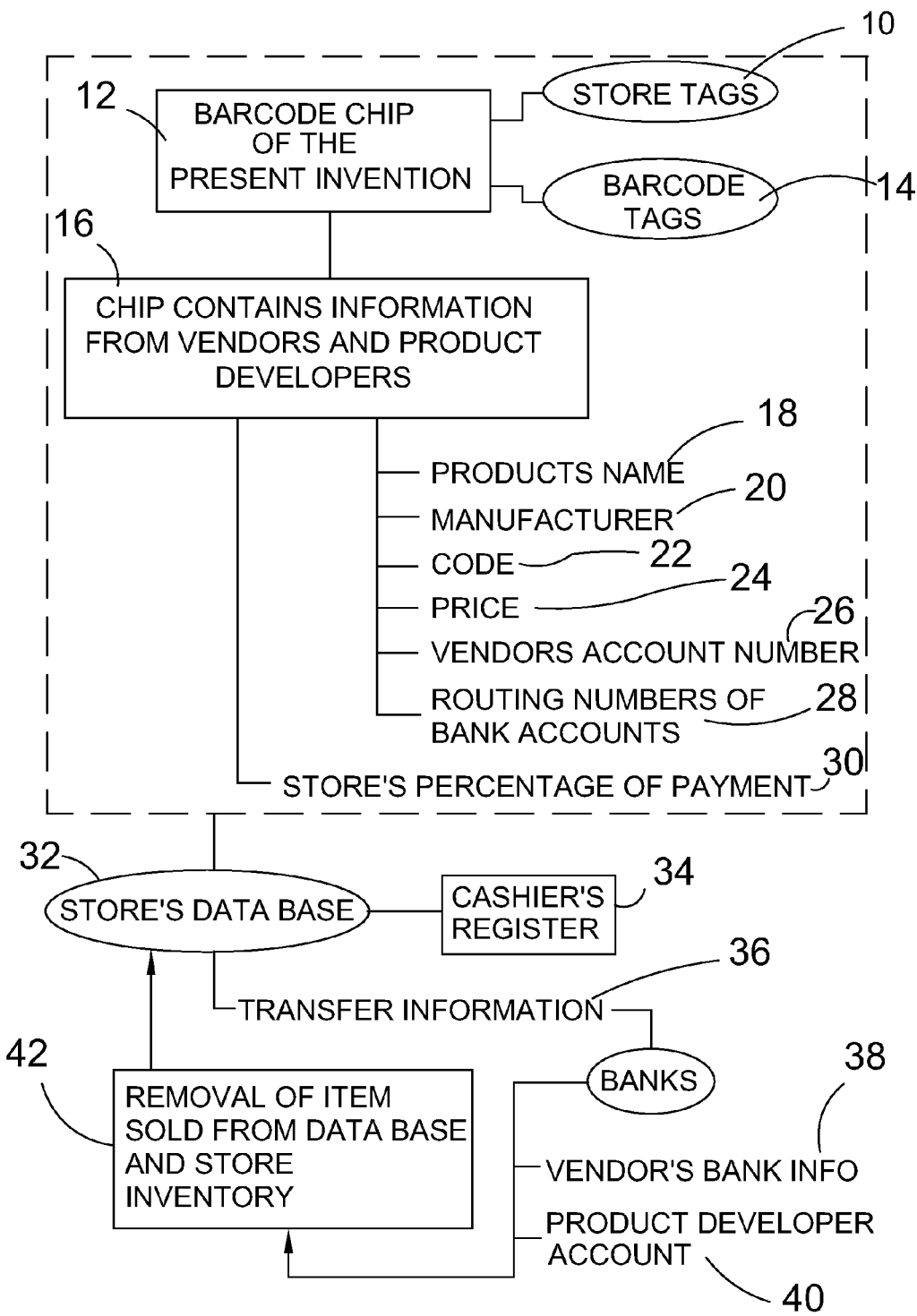
FIG. 2 is a first flow chart of the operation of the present invention.

FIG. 2 shows a flow chart of the present invention. The product label 10 as seen in FIG. 1 and the visible bar code 14 incorporate the chip 12 which contains information 16 necessary for the operation of the present invention. This information includes such items as the product name 18, the manufacturer or developer name 20, the individual product code 22 (a unique identifier that allows the product to be specifically enumerated at checkout so that the inventory is up-to-date), the product price 24, the retailer account number with the manufacturer or developer 26, the relevant bank account routing numbers and routing numbers 28, and the retailer or vendors percentage of the customers payment indicated at 30. This information may be programmed or burnt into the chip 12 at various points in the distribution system or additionally could be incorporated into the barcode itself and be activated by the scanning process. The percentage of payment 30 and the product price 24, for example, could be set at the retail level if desired to change the markup. The routing numbers 28 could be set at the manufacturer before shipping or the manufacturer could ship with their bank information included, allowing the retailer or other intermediate distributors to add their appropriate bank information at a later time downstream in the distribution system. The present invention thus allows for products to be shipped to various retailers with individual product codes and identification 22 for inventory purposes both at the manufacturers' level, the distributors' level, and the retailers' level without laborious cross-checking on paper invoices. It is contemplated that the manufacturer, the distributor (if present in the stream), and the retailer would all have databases including the individual product IDs or codes 22 allowing for all the users of the system of the present invention to know how much of each type of labeled item is where in the distribution stream. In this Figure, the retailer database is indicated at 32 and the point of sale or register is indicated at 34. When the customer purchases the labeled item, the barcode scanner S (as seen in FIG. 1) is used to read the alphanumeric data from the product info label 10 and the information transfer 36 is initiated. This utilizes the bank routing numbers and bank account numbers 28 contained in the barcode chip 12 to transfer the relevant funds to the vendor or retailer account as indicated at 38 and to the manufacturer or developer account as indicated at 40 while subtracting the cash amount from the customer's card as it is swiped. It also removes the individual product ID from the retailer database as indicated at 42 to reflect the change in the inventory. It should be noted that this inventory change could also be used at a distribution level, with the bar coded embedded chip being placed on a pallet or carton and having its own unique ID and cost. The operation shown in the Figures herein oriented towards retail are only a single example of the use of the present invention. With this embodiment of the present invention, inventories and markups all down the supply chain can be automated by simply scanning and then re-programming the needed chip at whatever volume level (single units, case units, pallet units, trucks, cargo containers, railroad cars, and the like). Cash and inventory information flow is quickly moved and updated, respectively.

Figure 3:
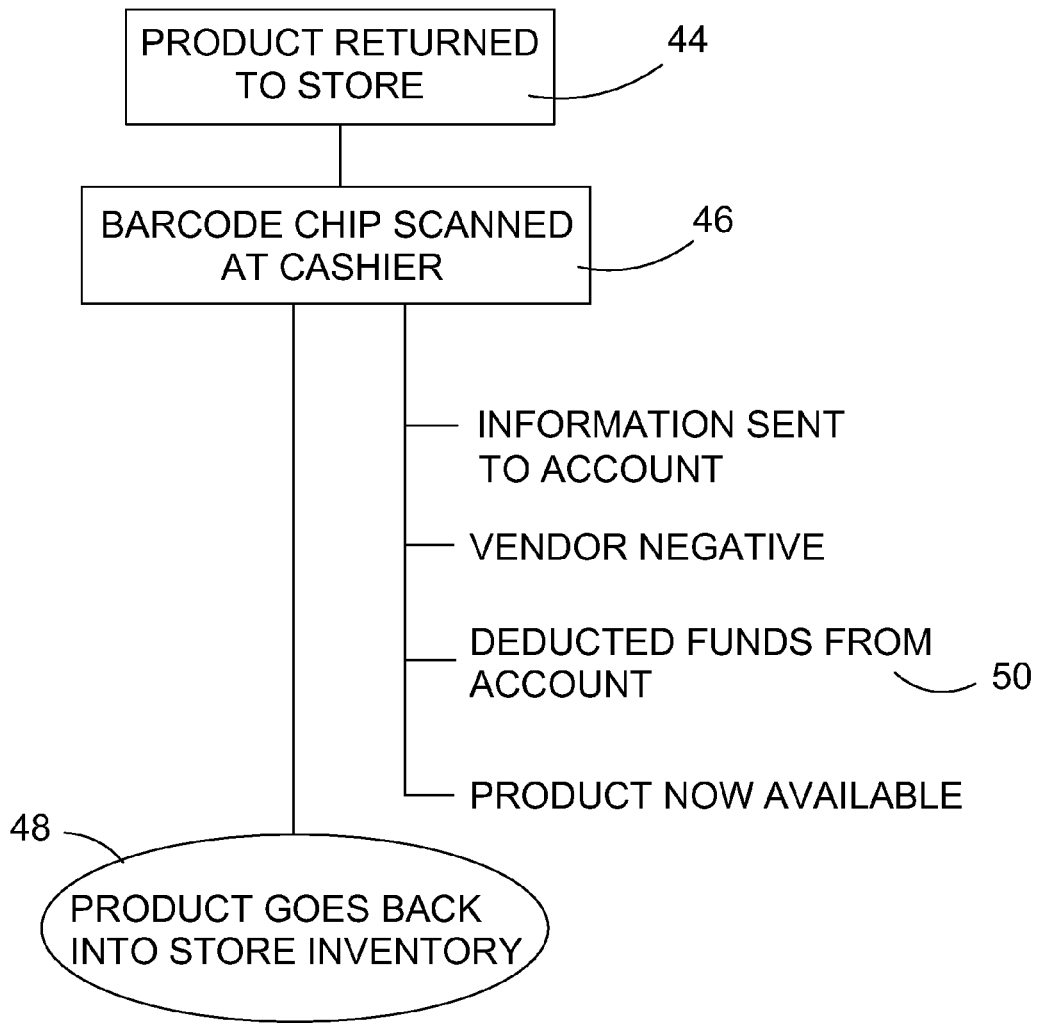
FIG. 3 is an additional flow chart of the operation of the present invention.

FIG. 3 is another flow chart detailing the steps that are used when a customer returns a purchased item to the retailer. When the product is returned at 44 it is scanned at the register as indicated at 46. At this point the individual product ID 22 is noted and it is placed back in the inventory as indicated at 48. The appropriate funds are deducted from the vendor or retailers bank account using the routing number 28 as seen in the Figure indicated at 50.

Figure 4:
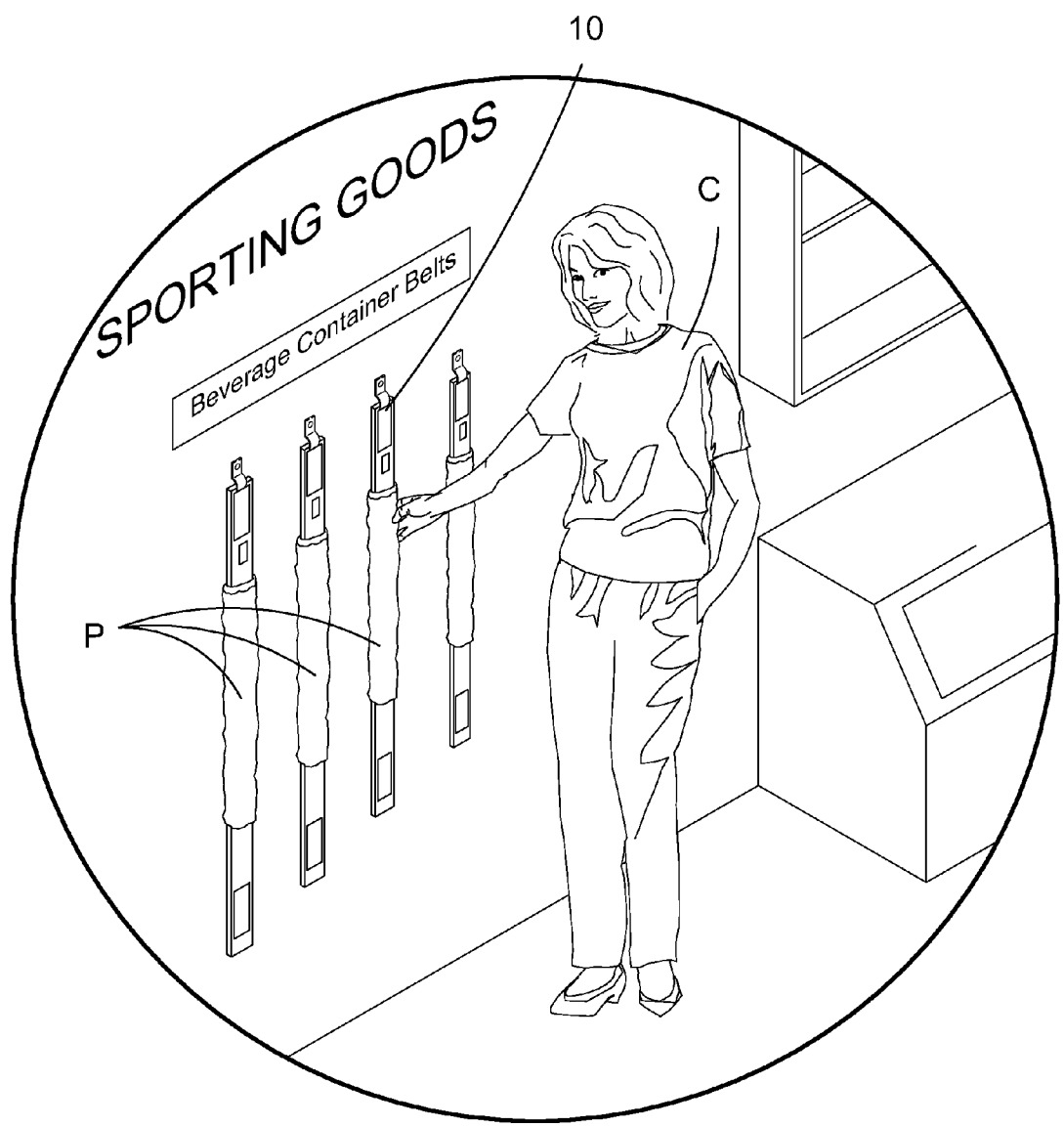
FIG. 4 is an illustrative view and example of the present invention in use.

FIG. 4 is an illustrative example of the present invention in use. A customer C is in a retail store to purchase a product P. There are a number of sizes.

Figure 5:
FIG. 5 is another illustrative view of the present invention in use as a customer chooses a labeled item.

FIG. 5 is a continuation of the illustrative example. Customer C has found the correct size of the product P.

Figure 6:
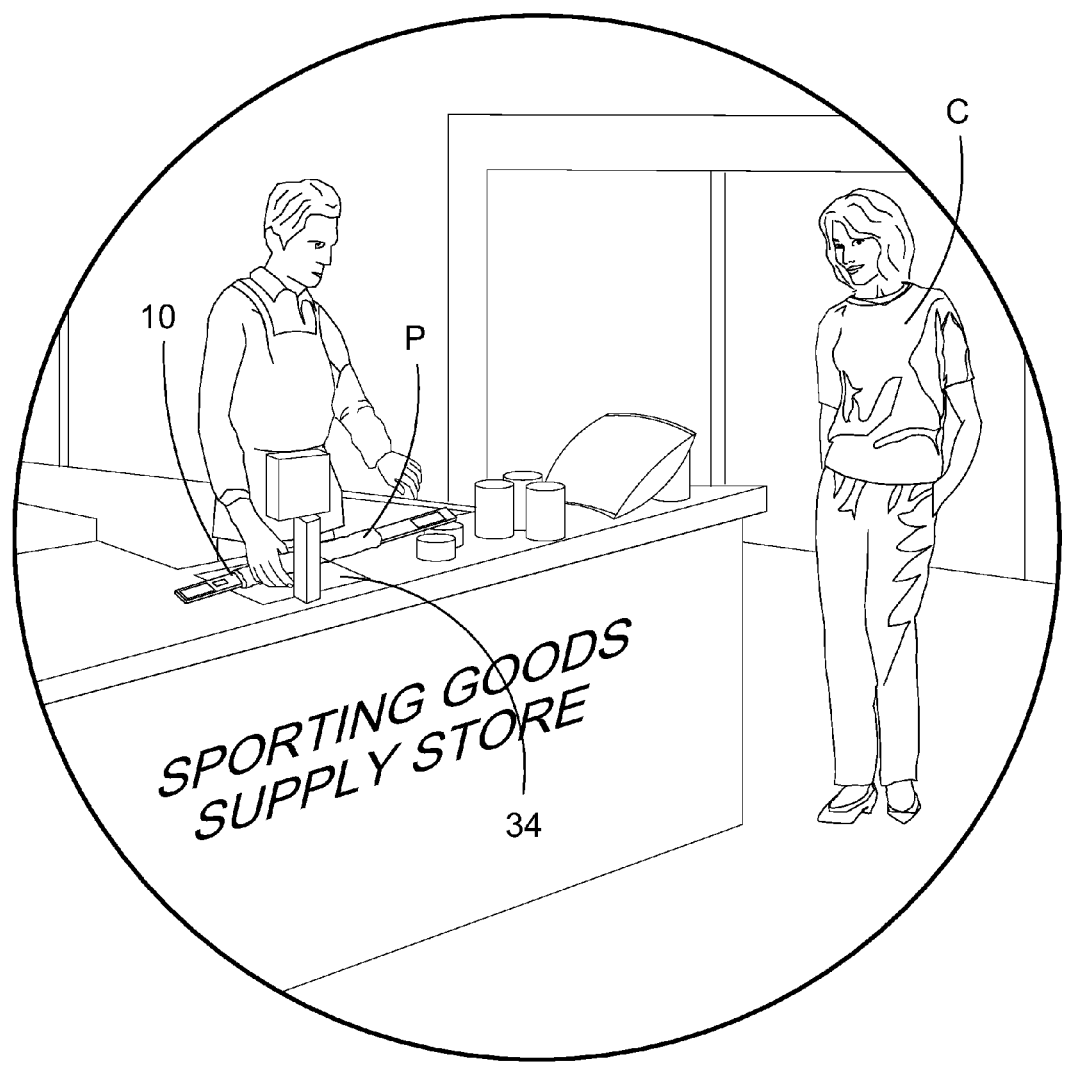
FIG. 6 is an illustrative view of the present invention in operation at the point of sale in a retail establishment.

FIG. 6 shows the customer C purchasing the product P. The product P is scanned at the point of sale register 34. Note the product info label 10, 12, 14 shown in FIGS. 4, 5, and 6.

The present invention then allows for a simplified and convenient tracking, inventory management, and payment system that obviates the problems inherent in a paper-based invoicing setup. Manufacturers can ship products to distributors or vendors with the barcode chips 12 located on each of the products and have an internal record of each of the products shipped, and to whom. Payments are made automatically as the purchaser, whether a consequent distributor or an end buyer, acquires the product in question. Returns are also dealt with as described above.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method of inventory tracking and automatic payment for a shipped and vended commodity comprising the steps of:

a) providing a product information label for said vended commodity including a bar code and an embedded barcode chip;
b) programming an individual identifier for each unit of said vended commodity on said embedded barcode chip;
c) programming a price for said vended commodity on said embedded barcode chip;
d) programming a vendor account ID on said embedded barcode chip for each unit of said vended commodity when it is shipped to a vending entity; and
e) programming bank account numbers and bank routing numbers information on said embedded barcode chip: such that when said vended commodity is purchased and scanned at a vendor location, said programmed bank account numbers and bank routing numbers information is accessed to transfer funds based on said programmed price to the programmed bank accounts.

2. The method as claimed in claim 1 further including a step of creating a database including each of said programmed individual identifiers.

3. The method as claimed in claim 2 further including a step comprising defining a percentage of said programmed price to be paid to the vending entity scanning said vended commodity.

4. The method as claimed in claim 2 where said database is maintained at a place of manufacture of said vended commodity and where said database includes each of said shipped and vended commodity unit individual identifier and vendor account ID.

5. The method as claimed in claim 4 further including a step comprising defining a percentage of said programmed price to be paid to the vending entity scanning said vended commodity.

6. The method as claimed in claim 1 where said programmed bank account numbers and bank routing numbers information includes bank account information for a manufacturer of said shipped and vended commodity.

7. The method as claimed in claim 6 where said programmed bank account numbers and bank routing numbers information further includes bank account information for the vending entity of said shipped and vended commodity.

8. The method as claimed in claim 7 further including a step of creating a database including each of said programmed individual identifiers.

9. The method as claimed in claim 8 further including a step comprising defining a percentage of said programmed price to be paid to the vending entity scanning said vended commodity.

10. The method as claimed in claim 8 where said database is maintained at a place of manufacture of said vended commodity and where said database includes each of said shipped and vended commodity unit individual identifier and vendor account ID.

11. The method as claimed in claim 10 further including a step comprising defining a percentage of said programmed price to be paid to the vending entity scanning said vended commodity.

12. The method as claimed in claim 11 where said database is maintained at the vending entity location and where said database includes each of said shipped and vended commodity unit individual identifier and vendor account ID.

* * * * *